(12) United States Patent
Divisi

(10) Patent No.: US 8,783,417 B2
(45) Date of Patent: Jul. 22, 2014

(54) MINIMAL LUBRICATION DEVICE WITH FINE REGULATION OF THE OIL FLOW

(75) Inventor: Walter Divisi, Monaco (IT)

(73) Assignee: Dropsa S.p.A., Milan (IT)

( * ) Notice: Subject to any disclaimer, the term of this patent is extended or adjusted under 35 U.S.C. 154(b) by 193 days.

(21) Appl. No.: 13/194,927

(22) Filed: Jul. 30, 2011

(65) Prior Publication Data
US 2012/0031703 A1   Feb. 9, 2012

(30) Foreign Application Priority Data
Aug. 6, 2010  (IT) ............................... MI2010A1517

(51) Int. Cl.
F16N 29/00   (2006.01)
F16N 7/34    (2006.01)

(52) U.S. Cl.
USPC ........................................................ 184/7.4

(58) Field of Classification Search
None
See application file for complete search history.

(56) References Cited

U.S. PATENT DOCUMENTS

| | | | |
|---|---|---|---|
| 2,830,767 A | 4/1958 | Herbenar | |
| 3,587,782 A | 6/1971 | Russell | |
| 3,626,977 A | 12/1971 | Riley et al. | |
| 3,706,355 A | 12/1972 | Oglesbee | |
| 4,245,465 A | 1/1981 | Milo | |
| 5,427,203 A * | 6/1995 | Anspach et al. | 184/6.26 |
| 5,598,974 A * | 2/1997 | Lewis et al. | 239/135 |
| 6,065,689 A * | 5/2000 | Kizer et al. | 239/126 |
| 6,263,913 B1 | 7/2001 | Kussel | |
| 2004/0238772 A1 | 12/2004 | Bachman | |

FOREIGN PATENT DOCUMENTS

| | | |
|---|---|---|
| DE | 2701580 A1 | 7/1978 |
| DE | 4113388 A1 | 10/1992 |
| DE | 29512697 UI | 12/1995 |
| EP | 0351579 A2 | 1/1990 |
| EP | 1600839 A2 | 11/2005 |
| GB | 589095 A | 6/1947 |

OTHER PUBLICATIONS

Search Report dated Mar. 15, 2011 from priority Appl No. MI2010A 001517.
Search Report dated Mar. 3, 2011 from priority Italian Application No. MI2010A 001516 corresponding to U.S. Appl. No. 13/194,933.
U.S. Appl. No. 13/194,933—"Improved Minimal Lubrication Device," filed Jul. 30, 2011.
Sep. 11, 2013, Office Action for U.S. Appl. No. 13/194,933, Walter Divisi et al. filed Jul. 30, 2011.
Feb. 25, 2014, Office Action for U.S. Appl. No. 13/194,933, Walter Divisi et al. filed Jul. 30, 2011.

* cited by examiner

Primary Examiner — William E Dondero
Assistant Examiner — Mark K Buse
(74) Attorney, Agent, or Firm — Novak Druce Connolly Bove + Quigg LLP

(57) ABSTRACT

A minimal lubrication device including a lubricant fluid storage reservoir, unit for raising the pressure of the lubricant fluid fed to at least one modular element, the modular element includes a lubricant fluid conduit intercepted by a flow regulator, and a compressed air conduit. The lubricant conduit and the compressed air conduit are associated with an air/lubricant mixer element. The flow regulator includes a valving element at least partly housed within a sized hole and movable therein via a control stem. The stem has at least one portion of conical profile having a length equal to at least 3 times the diameter of the sized hole.

19 Claims, 6 Drawing Sheets

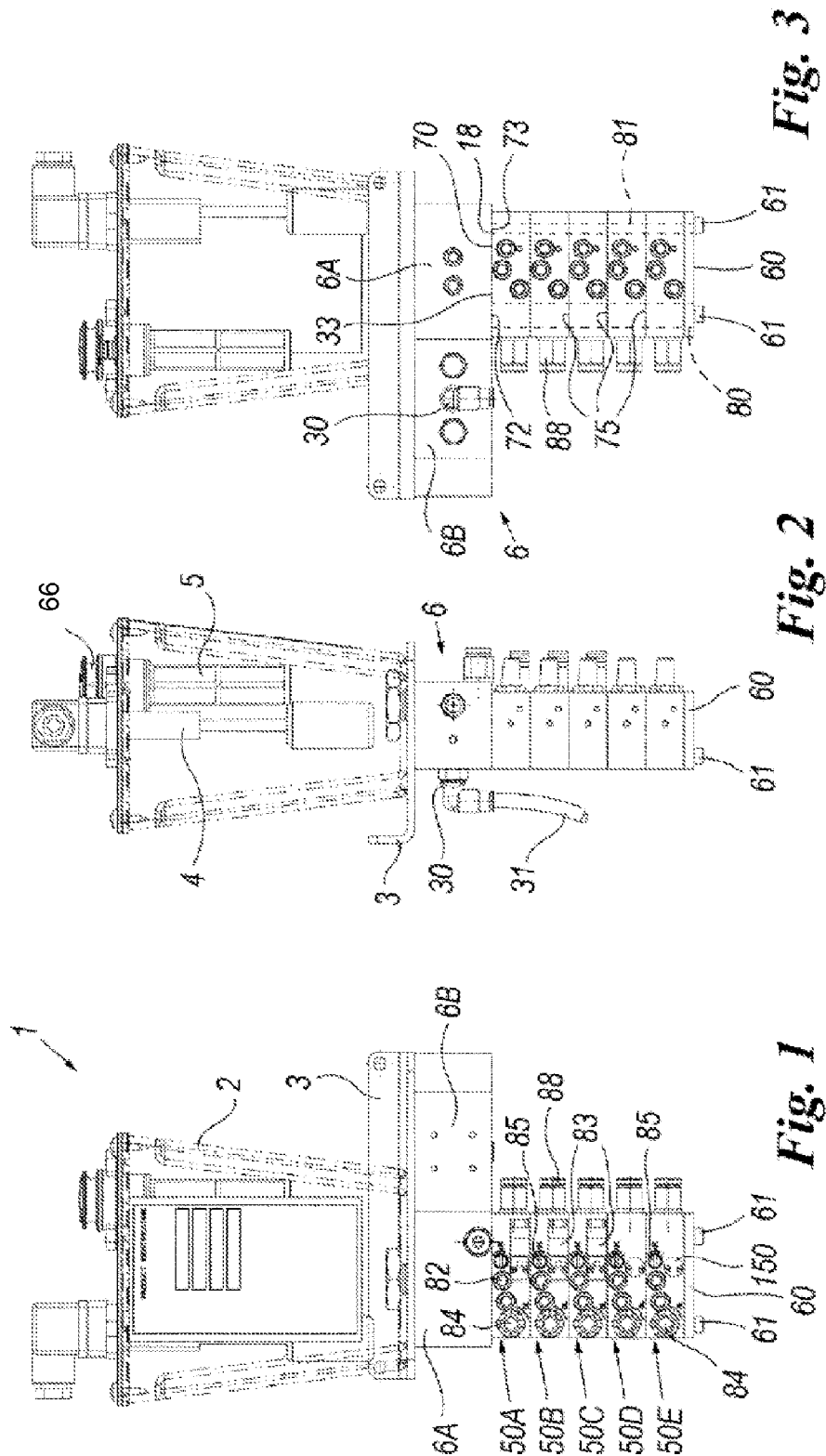

MINIMAL LUBRICATION DEVICE WITH FINE REGULATION OF THE OIL FLOW

CROSS-REFERENCE TO RELATED APPLICATIONS

This application claims priority under 35 USC 119 from Italian Application No. MI2010A 001517, filed on Aug. 6, 2010.

The present invention relates to a minimal air/oil lubrication device. More particularly, it relates to a modular device.

Air/oil lubrication represents a relatively recent reality, and is the result of the introduction of advanced technologies which have enabled it to be applied mainly in the field of dry machining. It has also replaced traditional spray systems because of their negative environmental impact.

Essentially, the lubrication takes place by feeding a continuous air flow which provides not only a transport means for the oil as far as the lubrication point, but also a cooling means for those members to be lubricated and for the lubrication system.

The oil, injected into the air flow continuously or at regular intervals, covers the surfaces to be lubricated, so reducing friction and wear.

Given that the oil quantity to be injected into the flow is very low, considerable problems of regulating this quantity arise in known devices.

An object of the present invention is therefore to provide an air/oil lubrication device which represents an improvement over the known art, being able to supply to the zone to be lubricated an air/oil jet with the correct lubricant quantity, enabling simple and accurate regulation of this quantity.

These and other objects are attained by an air/oil lubrication device in accordance with the technical teachings of the accompanying claims.

Further characteristics and advantages of the invention will be more apparent from the description of a preferred but non-exclusive embodiment of the invention, illustrated by way of non-limiting example in the accompanying drawings, in which:

FIGS. 1, 2 and 3 are respectively a front, side and rear view of the device of the present invention;

Figure 4:
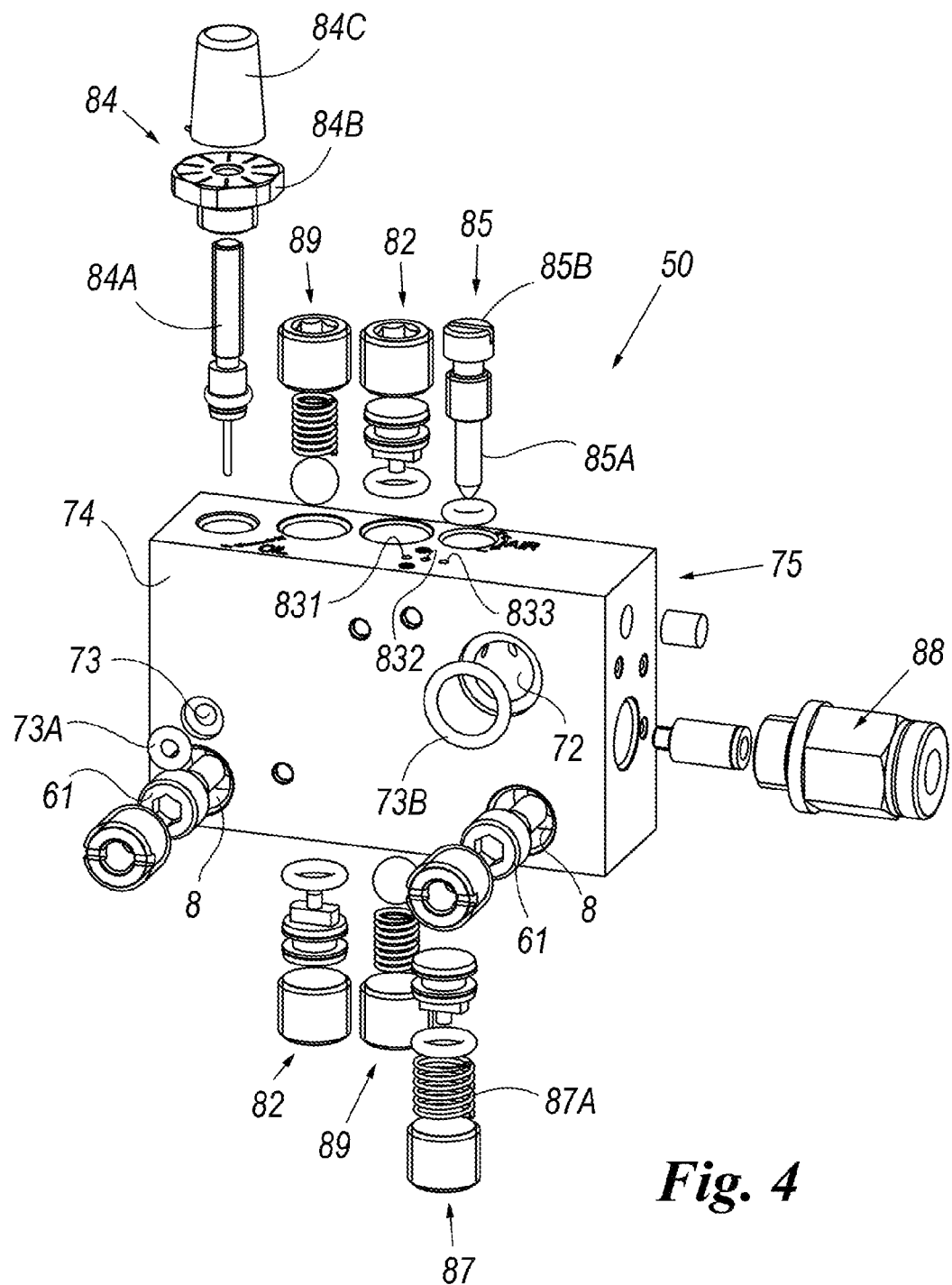
FIG. 4 is an exploded view of a modular oil/air mixer of the present invention.

With reference to said figures, these show an air/oil lubrication device indicated overall by the reference numeral 1.

It comprises a lubricant fluid storage reservoir 2 supported by a plate 3 to which the device is fixed. The reservoir comprises an element (for example of float type) for sensing the fluid level within it, and a filter 5 associated with an aperture 66 for feeding lubricant into the reservoir. The fixing plate 3 comprises a conduit connecting one end of the reservoir to the suction port of a high pressure pump 6 fixed below the date.

The conduit feeds lubricant fluid from the reservoir 2 to the suction port 7. The pump 6 comprises a hydraulic first block 6A for pumping the fluid via a cylinder 9, and a pneumatic second block 6B for operating the cylinder 9.

The pump advantageously supplies pressurized oil (advantageously between 10 and 100 bar) to the delivery line.

In an alternative embodiment the pump may not be present and the delivery line can be fed directly by an outlet of the reservoir which contains the lubricant pressurized by known pneumatic systems. In this case the lubricant pressure is between 3 and 40 bar.

Below the pump 6 a series of modular elements 50A, B, C, D, E are mounted resting one on another and fixed together and to the pump by a pair of through screws 61 housed in fixing holes provided through each modular element and at the pump 6.

The pump 6 has a surface 70 provided with a hole communicating with the delivery port 18 of the pump 6 and a hole 33 communicating with the compressed air feed 31.

Figure 6:
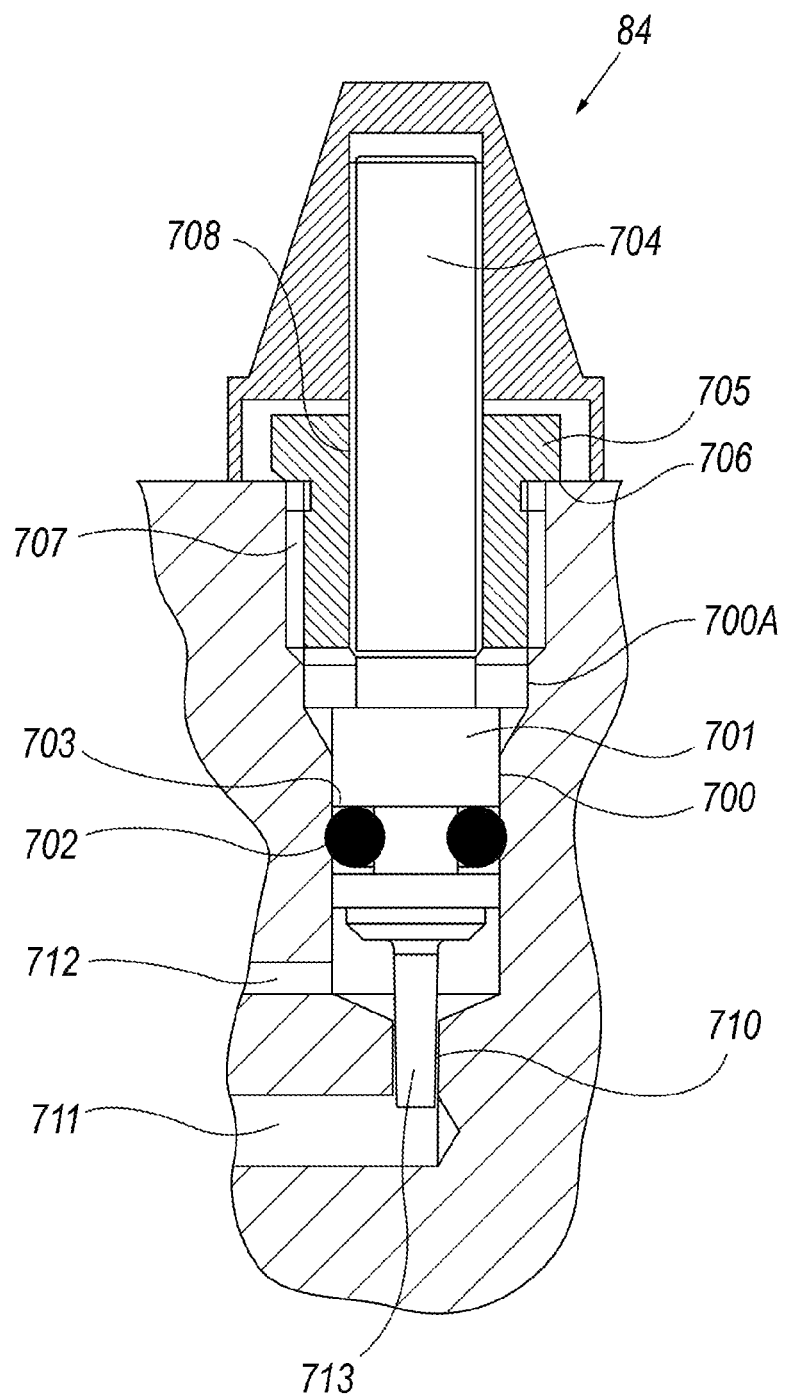
FIG. 6 is an enlarged section through a flow regulator integrated into the modular element.

Each modular element (FIG. 6) presents a first passage 72 with its axis coinciding with the axis of the pump hole 33 and a second passage 73 with its axis coinciding with the axis of the pump delivery port 18. The passages 72 and 73 are through passages opening into both the surfaces 74 and 75 of the modular element.

When several modular elements are fixed to the pump 6 as in FIG. 3, the passages 72 and 73 of each modular element define a pressurized oil conduit 81 and a compressed air conduit 80 connected respectively to the delivery port 18 of the pump 6 and to a compressed air source or feed 31.

Each modular element 50 draws from these conduits the compressed air and pressurized oil required for its operation.

In particular, the schematic circuit of each modular element 50 is shown in FIG. 4. From this it can be seen that the lubricant delivered by the pump 6 passes through the conduit 81 to the flow regulator 84 which regulates the entering oil quantity.

The flow regulator is formed from a cylindrical seat 700 within which a movable body 701 is sealedly movable. The seal is made by an O-ring 702 housed in an annular seat 703 provided in the movable body. A control stem 704 projects from and is integral with the movable body. The control stem has a length such as to project from the module in each operative position, and also has a thread which engages in a bush 705 screwed into a portion 700A of greater radius than the seat 700. The bush abuts via its flange 706 against the modular element, and acts as an upper travel limit for the movable body.

The control stem could also not be integral with the movable body, but be connected by a hinge which enables the stem to rotate idly on the movable body while remaining axially rigid with it.

The pitch of the thread 708 between the bush and stem is advantageously of 0.35 mm/revolution, but can be between 0.1 and 2.0 mm/revolution.

In the base of the seat 700 there is a sized hole 710 coaxial to the seat 700.

The hole opens into a conduit 711 connected to the delivery of said pressurized lubricant originating from the pump. The exit of the sized hole 710 opens into the seat 700 which itself communicates with the conduit 712 through which the lubricant leaves with regulated pressure. From the base of the movable body an integrally formed valving element projects, and is at least partly housed in the sized hole.

Figure 7:
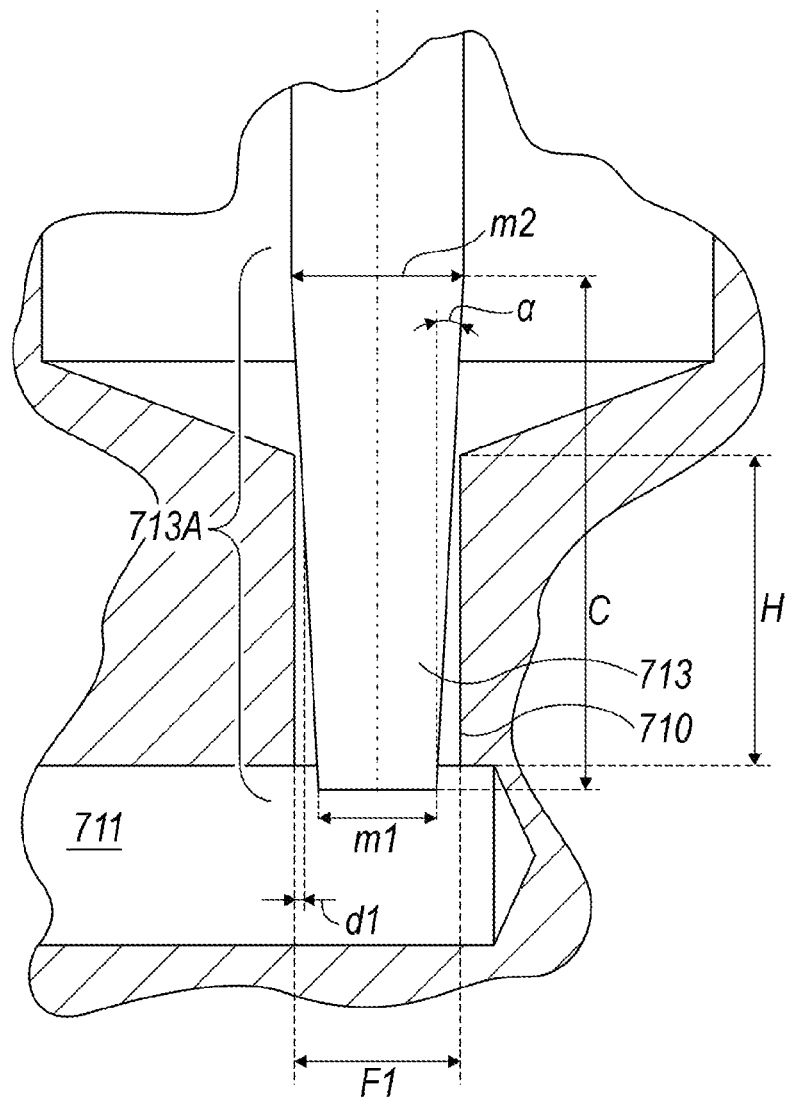
FIGS. 7 and 8 are sections through a valving element of the modular element in two different operating positions.
Figure 8:
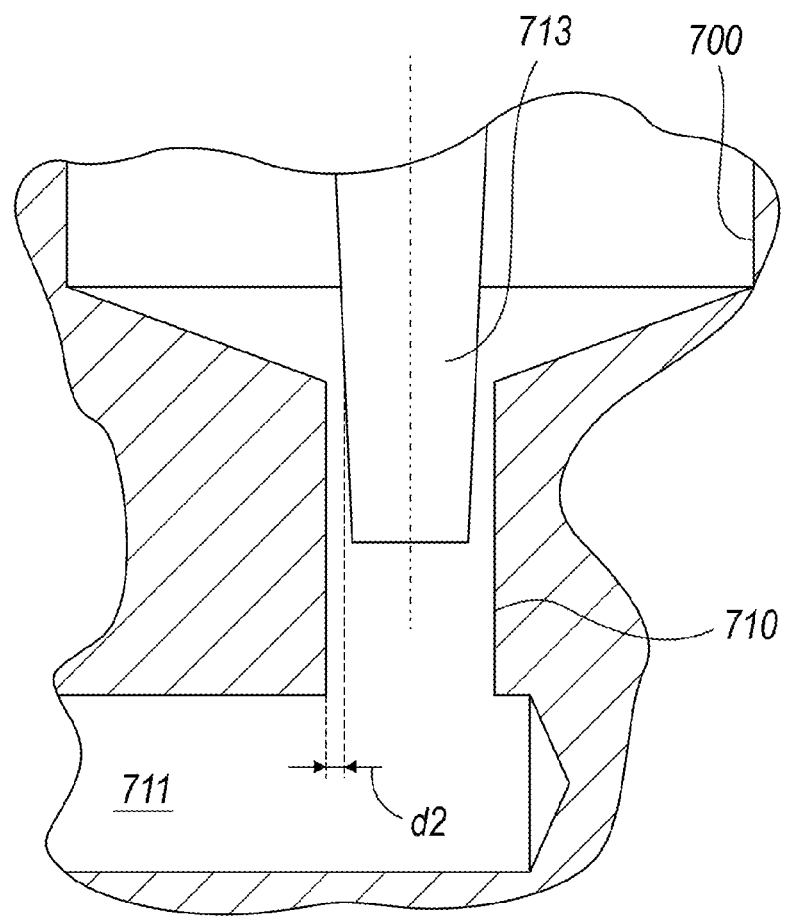

The valving element presents at least one portion 713A of conical profile (see FIG. 7) which generates with the sized hole an annular outlet port for the pressurized lubricant. Depending on the position of the valving element within the hole, the annular port will have a different passage surface for the lubricant, hence very fine and precise regulation of the lubricant flow can be obtained. This characteristic can be noted from the enlargement of FIGS. 7 and 8. For a considerable axial movement of the valving element, for example 2 or 3 revolutions, a minimum increase in the space d1, d2 between the wall of the sized hole and the conical surface of the valving element is obtained.

Advantageously the valving element has a stroke which never allows it to emerge from the sized hole when in its upper travel limit position. When the valving element is in its lower travel limit position there is preferably never a seal present between the valving element and the sized hole. Hence there will always be an at least minimum lubricant seepage as the annular port will never be perfectly closed.

The conical profile portion 713A has a surface inclined to the valving element axis by an angle a between 0.1 deg and 2 deg, but preferably 0.57 deg.

The minimum diameter m1 of said valving element (which is located at its bottom end) in said conical portion is between 0.5 mm and 5.0 mm, preferably 0.95 mm, while the maximum diameter of said valving element in said conical portion is between 0.55 mm and 5.1 mm, preferably 1.045 mm.

To obtain the flows necessary for setting a lubricant quantity suitable for minimal lubrication, the hole diameter F1 is between 0.5 mm and 5 mm, preferably 1.0 mm.

The hole has a height H between 2 mm and 10 mm, preferably 3 mm, while the conical portion of the valving element has a height C between 3 mm and 15 mm, preferably 4 mm.

Advantageously the height C of the conical profile portion has a length between 2 and 6 times the diameter of said gauged hole, preferably 4 times. The surface C is advantageously ground to a surface roughness of 0.8 μm.

In the described embodiment, the seat 700 and the sized hole 710 are formed directly in the module, however they can also be part of an insert which is inserted into it.

The line 84 is intercepted by a shut-off element which in the example is a pilot piston 82 coupled to a spring-loaded valve 89 controlled by a solenoid valve 83. The conduit 90 also presents a branch connecting it to an anti-drip piston 87 further connected to the compressed air feed. When air is present in the conduit 80 it assumes the position shown by the arrow F (opposite to that illustrated, with the spring 87A compressed). When the conduit 80 is without pressure the spring 87A lengthens and the piston returns to the illustrated position to draw the lubricant present in the conduit 90 into a chamber 87B.

The conduit 80 communicates via the passage 72 with an air flow adjustment cock 85, the outlet of which opens into the mixing element 88 via a conduit 810. The cock 85 also presents a needle valving element 85A, this time of conventional type, having a head 85B enabling it to be operated.

As in the preceding case, the conduit 810 is intercepted by a further pilot piston 82 with a spring-loaded valve 89 also controlled by the solenoid valve 83.

The entry conduit 831 of the solenoid valve 83 (optional, and not present for example in the elements 50D. 50E) communicates with the compressed air conduit 80. It is able to connect a conduit 832 controlling the pilot pistons 82 to a discharge line 833 (pistons 2 open and lines 86 and 810 operative), or to the entry conduit 831 (pistons 2 closed and lines 86 and 810 inoperative).

The mixing element 88 is essentially a nozzle which can be provided directly on each module 50 (FIG. 4), i.e. integrated therein, or can be connected to the respective module via separate air and lubricant pipes T which bring it directly in proximity to the point at which lubrication is required. In the first case a single air/oil pipe is sufficient, extending from the module to the position of use.

In concluding the device description it should be noted that if the solenoid valve 83 is absent, the holes provided in each modular element 50 which derive from the conduits 831, 832 and 833 are closed by a plate 150. In that case the pilot pistons 82 are always in a position such as to enable fluids to pass into the conduits 90 and 810.

In addition the air cock 85 could also not be provided. Each module could then be fed by a different air source, the conduit 80 hence being absent.

The device operation is apparent to the expert of the art from the aforegoing description, and is as follows.

The pump 6 pressurizes the lubricant fluid (for example oil) withdrawn from the reservoir 2. The pump is operated by compressed air which is provided by the compressed air source 31.

It feeds both air and oil to each of the modules 50 fixed to it in series, via the conduits 80 and 81 formed by passages provided directly within each of the modules and coupled together by means of gaskets 73A, 73B.

The various modules are fixed together by screws 61 passing through suitable holes 8 provided in each module.

Alternatively the modules can be fed directly by the reservoir suitably pressurized, for example pneumatically, and by a suitable compressed air source.

Each module provides for mixing a fluid quantity adjustable by the flow regulator 84. The air quantity delivered by each module can also be adjusted, by means of the cock 85. Lubricant regulation is very fine as the pitch of the screw controlling the valving element enables perfect regulation of the annular passage space for the lubricant which is formed between the valving element and the sized hole. For example, at a pressure of 1.5 bar the passage space goes from a minimum of 0 mm$^2$ to a maximum of 0.064 mm$^2$ corresponding to an oil quantity ranging from 0 ml/min to 6 ml/min.

In this respect, at a stage prior to the use of the device one modular element 50 could be activated at a time and the delivered oil quantity be regulated. In this manner a precise adjustment of the oil quantity delivered by each element can be achieved.

Figure 5:
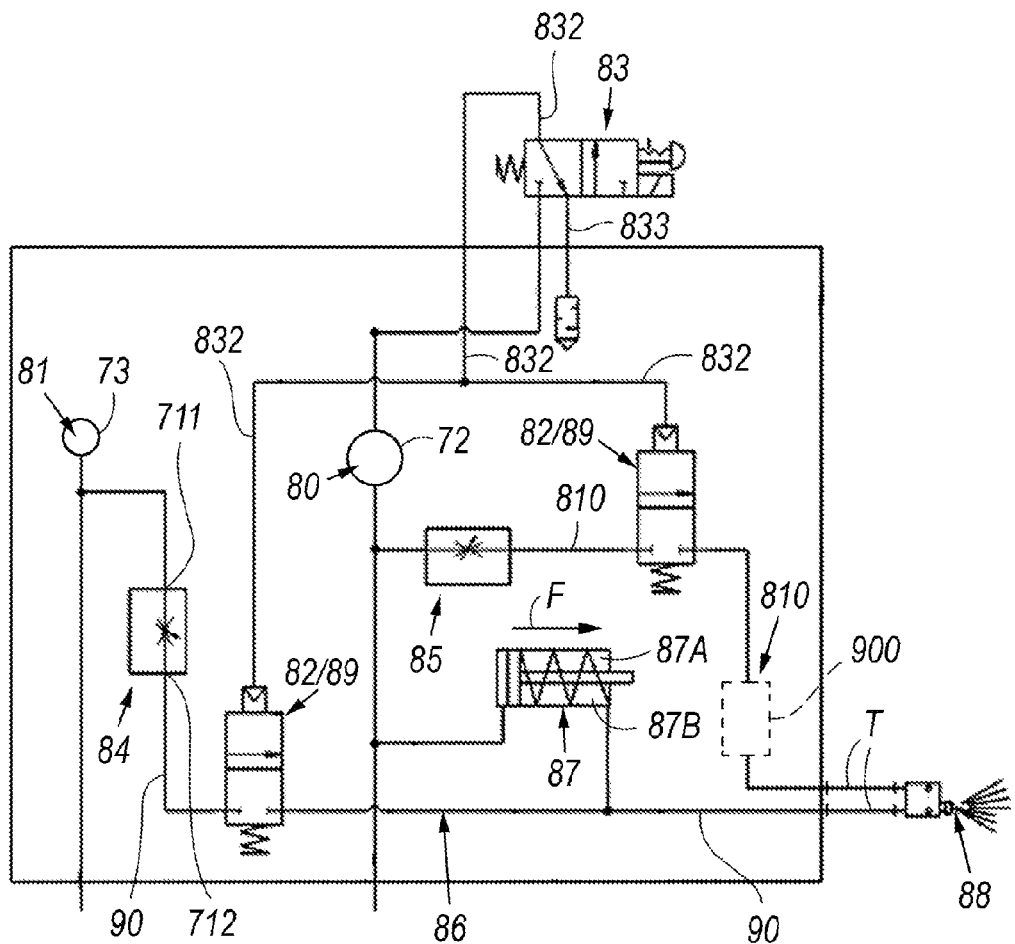
FIG. 5 shows a scheme of the modular mixer element.

Advantageously, a vortex tube 900 is provided in the conduit 810 of each module (FIG. 5) to regulate the temperature of the air fed to the nozzle 88. The vortex tube is housed in the module or directly formed within it. In this manner, the temperature of the air fed to the nozzle 88 can be regulated by a suitable regulator screw. This enables a valid cooling effect to be achieved in addition to lubrication.

The invention claimed is:
1. A minimal lubrication device comprising
   a lubricant fluid storage reservoir;
   a modular element; and
   means for raising the pressure of a lubricant fluid fed from the lubricant storage reservoir to at least one modular element,
   the modular element comprising
      a flow regulator,
      an air/lubricant mixer element comprising
         a lubricant fluid conduit intercepted by the flow regulator, and
         a compressed air conduit,
   wherein the flow regulator comprises a movable valving element at least partly housable within a sized hole and movable therein via a control stem,
   wherein the flow regulator further comprises a bush abutting the modular element to act as an upper travel limit for the movable valving element, the sized hole communicating at one end with the delivery of said pressurized lubricant and at the other end with an outlet of said flow regulator,
   said stem having at least one portion of conical profile insertable into said sized hole, wherein said at least one portion of conical profile has a surface inclined to the axis of the valving element by an angle between 0.1 deg and 2 deg.

2. A device as claimed in claim 1, wherein said portion of conical profile has a length equal to between 2 and 4 times the diameter of said sized hole.

3. A device as claimed in claim 2, wherein the minimum diameter of said valving element within said conical portion is in a range from 0.5 mm and 0.95 mm, the maximum diameter of said valving element within said conical portion is in a range from 0.55 mm to 1.045 mm, wherein the diameter of said hole is in a range from 0.5 mm to 1.0 mm and a height between 2 mm and 10 mm, and the conical portion has a height between 3 mm and 15mm, wherein said portion of conical profile has a surface inclined to the axis of the valving element by an angle between 0.1 deg and 0.57 deg.

4. A device as claimed in claim 3, wherein the maximum passage space between the hole and conical portion is 0.064 mm$^2$.

5. A device as claimed in claim 1, wherein the flow regulator comprises a cylindrical seat in which a movable body is sealedly slidable, from which the valving element projects, the movable body being associated with said control stem to adjust, via the thread, the position of the movable body relative to the seat, said sized hole being coaxial with the seat and being provided in its base.

6. A device as claimed in claim 1, wherein said stem presents a thread engaged with the bush screwed into said module.

7. A device as claimed in claim 1, wherein said stem is formed integrally with the movable valving element.

8. A device as claimed in claim 1, wherein the movable valving element presents an annular seat for housing an O-ring.

9. A device as claimed in claim 8, wherein said annular seat and said sized hole are formed directly in the module interior.

10. A device as claimed in claim 1, wherein the minimum diameter of said valving element within said conical portion is between 0.5 mm and 5.0 mm, the maximum diameter of said valving element within said conical portion being between 0.55 mm and 5.1 mm.

11. A device as claimed in claim 1, wherein the diameter of said hole is between 0.5 mm and 5.0 mm.

12. A device as claimed in claim 1,
wherein the movable valving element further comprises a control stem projecting from the movable valving element, the control stem threadedly engaging the bush via a thread,
wherein the pitch of said thread is between 0.1 mm/revolution and 2 mm/revolution.

13. A device as claimed in claim 12, wherein the pitch of said thread is in a range from 0.1 mm/revolution to 0.35 mm/revolution.

14. A device as claimed in claim 1, wherein said portion of conical profile has a surface inclined to the axis of the valving element by an angle between 0.1 deg and 0.57 deg.

15. A device as claimed in claim 1, wherein the minimum diameter of said valving element within said conical portion is in a range from 0.5 mm and 0.95 mm, the maximum diameter of said valving element within said conical portion is in a range from 0.55 mm to 1.045 mm.

16. A device as claimed in claim 1, wherein the diameter of said hole is in a range from 0.5 mm to 1.0 mm.

17. A device as claimed in claim 1, wherein said portion of conical profile has a length equal to 4 times the diameter of said sized hole.

18. A device as claimed in claim 1, wherein the minimum diameter of said valving element within said conical portion is in a range from 0.5 mm and 0.95 mm, the maximum diameter of said valving element within said conical portion is in a range from 0.55 mm to 1.045 mm, wherein the diameter of said hole is in a range from 0.5 mm to 1.0 mm and a height between 2 mm and 10 mm, and the conical portion has a height between 3 mm and 15 mm, wherein said portion of conical profile has a surface inclined to the axis of the valving element by an angle between 0.1 deg and 0.57 deg.

19. A device as claimed in claim 18 wherein the maximum passage space between the hole and conical portion is 0.064 mm$^2$.

* * * * *